(12) United States Patent
Detry et al.

(10) Patent No.: US 8,270,100 B2
(45) Date of Patent: Sep. 18, 2012

(54) OPTICAL COMPONENT DESIGN FOR SILICON OPTICAL BENCH

(75) Inventors: James F. Detry, Plymouth, MN (US); Thomas Ohnstein, Roseville, MN (US); Jennifer S. Strabley, Maple Grove, MN (US); Sean Moore, Plymouth, MN (US)

(73) Assignee: Honeywell International Inc., Morristown, NJ (US)

( * ) Notice: Subject to any disclaimer, the term of this patent is extended or adjusted under 35 U.S.C. 154(b) by 247 days.

(21) Appl. No.: 12/611,474

(22) Filed: Nov. 3, 2009

(65) Prior Publication Data

US 2011/0102894 A1 May 5, 2011

(51) Int. Cl.
*G02B 7/02* (2006.01)
(52) U.S. Cl. ...................................... 359/811
(58) Field of Classification Search .................. 359/811
See application file for complete search history.

(56) References Cited

U.S. PATENT DOCUMENTS

| | | | |
|---|---|---|---|
| 4,600,272 A | 7/1986 | Dost et al. | |
| 6,027,254 A | 2/2000 | Yamada et al. | |
| 6,136,411 A | 10/2000 | Dautartas | |
| 6,255,724 B1 * | 7/2001 | Ambrosy et al. | 257/678 |
| 6,487,355 B1 | 11/2002 | Flanders | |
| 6,869,881 B2 | 3/2005 | Deliwala | |
| 7,372,618 B2 | 5/2008 | Nam et al. | |
| 2002/0131717 A1 | 9/2002 | Kovalchick | |
| 2004/0184811 A1 | 9/2004 | Takamori | |
| 2006/0133739 A1 | 6/2006 | Kim et al. | |
| 2009/0219498 A1 | 9/2009 | Kono | |
| 2010/0208265 A1 | 8/2010 | Neus | |

FOREIGN PATENT DOCUMENTS

| | | |
|---|---|---|
| EP | 1256830 | 11/2002 |
| EP | 1335226 | 8/2003 |
| WO | 2009063852 | 5/2009 |

OTHER PUBLICATIONS

European Patent Office, "European Search Report", Dec. 27, 2010, Published in: EP.

* cited by examiner

*Primary Examiner* — James Jones
(74) *Attorney, Agent, or Firm* — Fogg & Powers LLC

(57) ABSTRACT

An optical component is provided. The optical component includes an optical-path portion including an arm-connecting portion and a lower portion, a first arm extending from a first end of the arm-connecting portion, and a second arm extending from a second end of the arm-connecting portion. The first arm has at least one resting feature and the second arm has at least one resting feature. The optical-path portion has an input surface. When the resting features of the first arm and the second arm are positioned on a top surface at short edges of a trench in a trench system, the optical-path portion is vertically aligned in the trench.

11 Claims, 11 Drawing Sheets

OPTICAL COMPONENT DESIGN FOR SILICON OPTICAL BENCH

CROSS-REFERENCE TO RELATED APPLICATIONS

This application is related to U.S. patent application Ser. No. 11/969,822 having a title of "BAND GAP FIBER RESONATOR IMPLEMENTATION ON A SILICON OPTICAL BENCH" (also referred to here as the "'822 Application") filed on Jan. 4, 2008. The '822 application is hereby incorporated herein by reference. This application is also related to U.S. patent application Ser. No. 12/026,458 having a title of "MIRRORS FOR A FREE SPACE MICRO-MACHINED OPTICAL BENCH" (also referred to here as the "'458 Application") filed on Feb. 5, 2008. The '458 application is hereby incorporated herein by reference. This application is also related to U.S. patent application Ser. No. 12/371,384 having a title of "METHOD FOR INSERTING MIRRORS INTO A MEMS SILICON OPTICAL BENCH" (also referred to here as the "'384 Application") filed on Feb. 13, 2009. The '458 application is hereby incorporated herein by reference.

BACKGROUND

There are many challenges related to the fabrication and assembly of optical systems configured in trenches formed in a substrate, such as a silicon optical bench (SiOB) formed within a silicon substrate. In a silicon optical bench, a silicon substrate is used as the base for the optical system. In a free space optical waveguide SiOB, light travels in free space of trenches that are formed on the surface of the silicon wafer. Various etches are used to form v-grooves and trenches of an SiOB. For example, KOH is used to form v-grooves in the silicon surface and deep reactive ion etching (DRIE) is used to form trenches in the silicon through which optical beams propagate. Optical components such as optical fibers, lenses, transmission windows, mirrors, beam splitters, polarizers and other components that direct (i.e., guide, reflect, split, or polarize) the optical beams through a trench system are positioned within the v-grooves and/or trenches.

The trenches that are formed in the trench system to hold optical components, such as the windows, mirrors, beam splitters or polarizers, are typically slightly oversized to enable the insertion of the optical component. The optical components are generally cut or sawn from a large substrate, such as a silicon wafer, into the size(s) needed for the SiOB. The optical components formed by sawing up the components have a square or rectangular shape.

Trenches with non-vertical side wall profiles are created by the silicon etches typically used to form the trenches, such as DRIE. In some cases, the trench has a profile that widens or slopes outward from the bottom of the trench to the top surface of the silicon so the trench is wider at the surface of the substrate than at the depth of the trench. In other cases, a re-entrant profile trench is generated that is narrow at the top surface and widens going from the top surface to the bottom of the trench.

Over-sized trenches and/or non-vertical trench side walls tilt the components placed in the trenches with respect to the optical path. When components such as mirrors, transmission windows, and beam splitters are tilted, they direct optical energy out of the desired optical path, thereby diminishing the optical signal at the output end, and possibly directing unwanted optical energy into other optical systems.

SUMMARY

The present application relates to an optical component. The optical component includes an optical-path portion including an arm-connecting portion and a lower portion, a first arm extending from a first end of the arm-connecting portion, and a second arm extending from a second end of the arm-connecting portion. The first arm has at least one resting feature and the second arm has at least one resting feature. The optical-path portion has an input surface. When the resting features of the first arm and the second arm are positioned on a top surface at short edges of a trench in a trench system, the optical-path portion is vertically aligned in the trench.

DRAWINGS

The present invention is illustrated by way of example and not limitation in the accompanying figures, in which like reference numbers and designations in the various drawings indicate like elements, and in which.

DETAILED DESCRIPTION

Non-rectangular optical components that can be inserted into an optical trench system (e.g., an SiOB), in which optical beams propagate in free space, without a vertical tilt angle error are described herein. Methods of making such optical components are also described herein. The non-rectangular optical components have arms or protrusions, which extend out to the sides of the optical component. When the optical component is inserted into a trench in an optical trench system (e.g., an SiOB), the protruding arms sit on the optically flat top surface of the optical trench system so that a portion of the non-rectangular optical component is suspended within the trench and is vertically aligned within the trench. Thus, the optical component is also vertically aligned with an optical beam propagating along an optical path within the trench or above the trench. Since the optical elements hang vertically, the optical beam reflecting from the surface is not reflected out of the plane of the optical bench. Also, since the elements hang vertically, the angle of incidence is controlled for proper functioning of the optical component. Thus, by ensuring the optical component is suspended within the trench, errors associated with a tilted optical component are minimized and potentially eliminated. Additionally, the optical component can be designed with non-parallel side walls to facilitate placement and holding (with out lateral movement) of the optical component within a trench, even if the trench has non-vertical side walls.

Figure 1A:
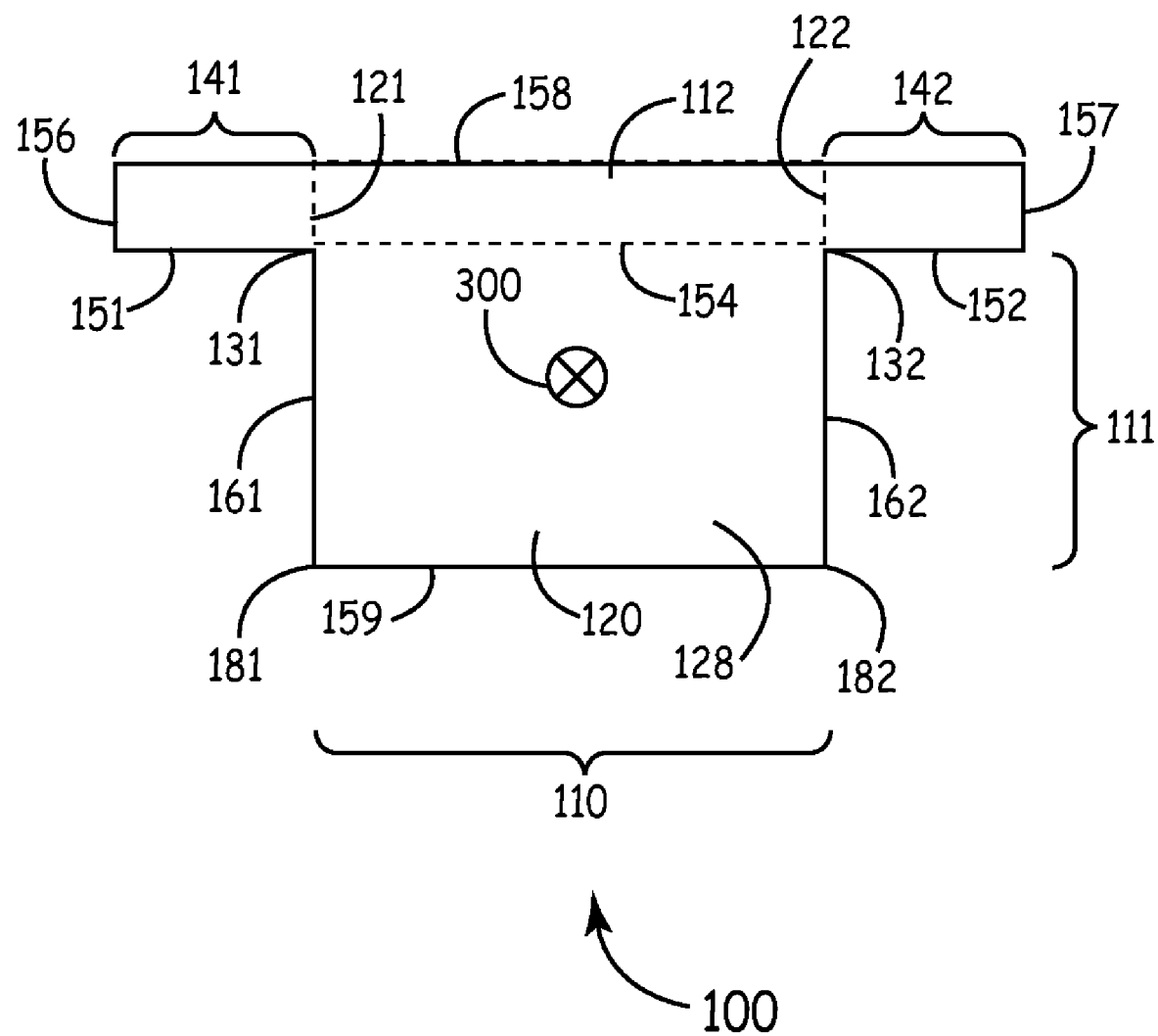
FIG. 1A is a front plan view of an embodiment of an optical component in accordance with the present invention.
Figure 1B:
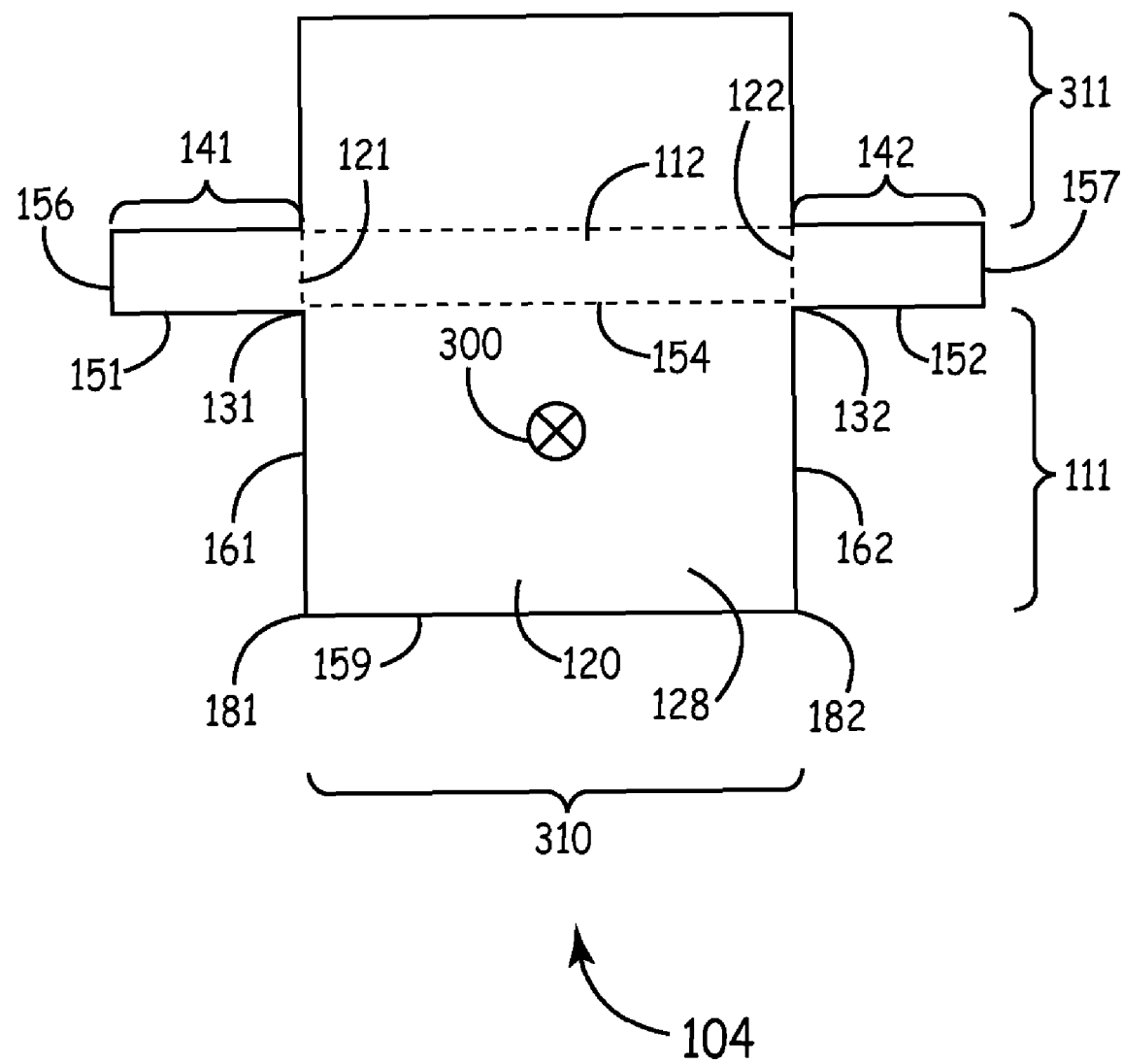
FIG. 1B is a front plan view of an embodiment of an optical component in accordance with the present invention.
Figure 2:
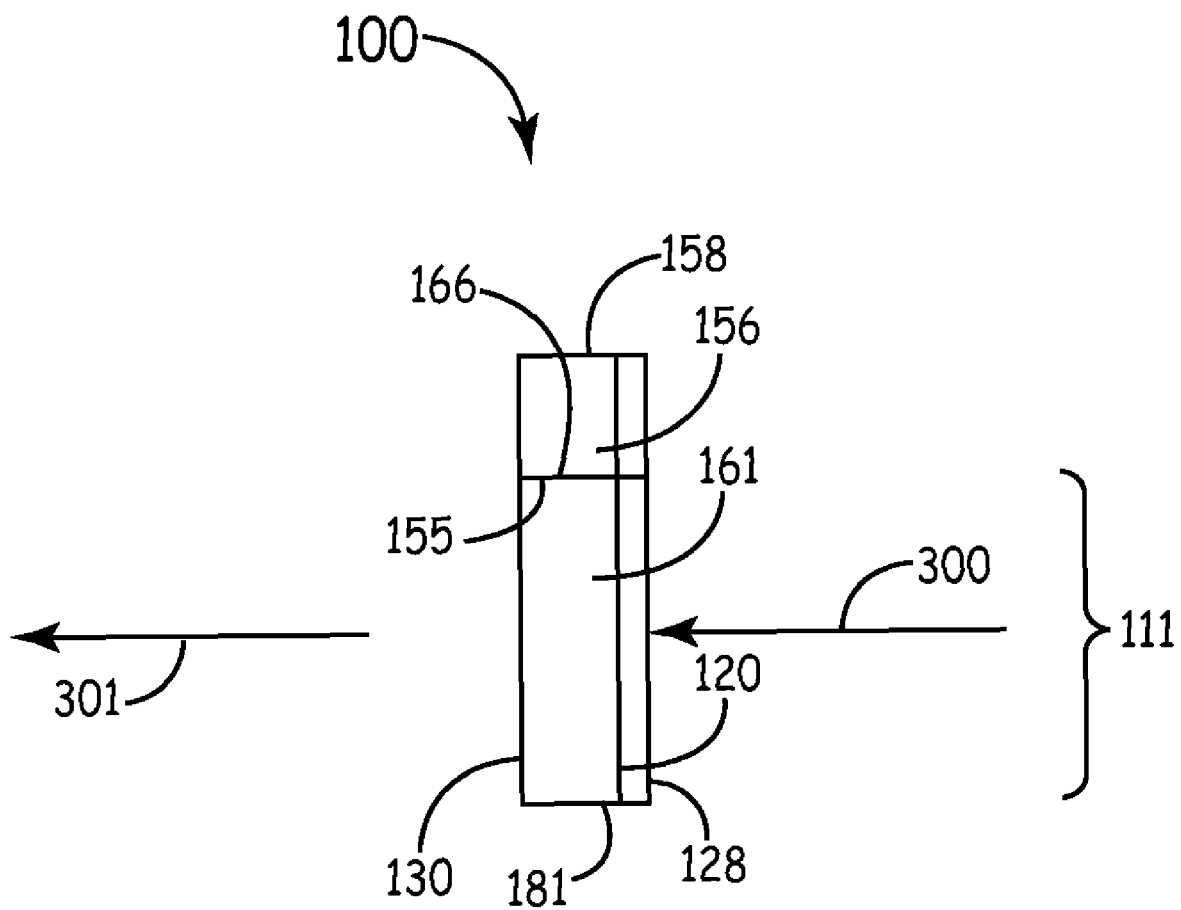
FIG. 2 is a side view of the optical component of FIG. 1A.

FIG. 1A is a front plan view of an embodiment of an optical component 100 in accordance with the present invention. FIG. 1B is a front plan view of an embodiment of an optical component 104 in accordance with the present invention. FIG. 2 is a side view of the optical component 100 of FIG. 1A. The optical component 100 includes an optical-path portion 110, a first arm 141, and a second arm 142. The optical-path portion 110 includes an arm-connecting portion represented generally at 112 and a lower portion 111. The arm-connecting portion 112 includes (and is bounded by) a top surface 158, a first end 121, a second end 122, and boundary 154 between the arm-connecting portion 112 and the optical-path portion 110. The second end 122 of the arm-connecting portion 112 opposes the first end 121 of the arm-connecting portion 112. The first end 121, the second end 122, and the boundary 154 are all shown in cross-section as dashed lines in FIG. 1A. The first arm 141 extends from the first end 121 of the arm-connecting portion 112 and has at least one resting feature 151. The second arm 142 extends from the second end 122 of the arm-connecting portion 112 and has at least one resting feature 152. The first side-surface 156 of the first arm 141 opposes the second side-surface 157 of the second arm 142. In FIG. 2, the first side-surface 156 of the arm 141 is viewed end-on.

As shown in FIG. 1B, the optical component 104 includes an optical-path portion 310, a first arm 141, and a second arm 142. The optical-path portion 310 includes the arm-connecting portion 112, the lower portion 111, and an upper portion 311. The arm-connecting portion 112 is positioned between the lower portion 111 and the upper portion 311. The arm-connecting portion 112 and the upper portion 311 extend above a top surface of a trench system when the optical component is positioned in a trench. The optical component 104 is used in trench systems to guide a free space optical beam above the top surface of the trench system.

The resting features 151 and 152 can be a flat surface (referred to herein as resting surface) or a front-side edge and a parallel back-side edge that are spaced apart by a wedge-shaped side wall. In the embodiment of FIGS. 1A, 1B, and 2, the resting feature 151 is a flat resting surface 155 (FIG. 2).

As shown in FIG. 2, the optical component 100 has an input surface 120 and an output surface 130. The output surface 130 is substantially parallel to the input surface 120. The input surface 120 is overlaid with a functional coating 128. The terms "side-surface" of an optical component and "side wall" of an optical component are used herein interchangeably. The terms "input surface," "first surface," and "front surface" are used herein interchangeably. Likewise, the terms "output surface," "second surface," and "back surface" are used herein interchangeably. It is to be understood, optical beams can be input to the optical components from either the input surface or the output surface, as will be the case for embodiments of trench systems that have components bidirectionally receiving optical beams. All embodiments of the optical components described herein have a front and back surface, at least two side walls, a bottom surface, and arms extending from the optical component at the top of the side surfaces. In embodiments in which the optical component includes a mirror (a totally reflective surface) on the front surface, the back surface is not used to direct light.

A functional coating is formed from one or more layers of material each having the appropriate thickness and refractive index to modify an optical beam according to the function of the optical component being formed by the functional coating when: 1) the optical beam is at the required wavelength (or a range of wavelengths); and 2) the optical beam is incident on the input surface 120 at a functional incidence angle. The optical component performs its intended function when the optical beam is incident at the functional incidence angle. The function of the optical component can include polarizing, total reflection, partial reflection, wavelength beam splitting, polarization beam splitting, narrow band transmission, narrow band reflection, beam blocking, and beam focusing. The functional coating can also be a pattern etched into the surface of the front and/or back surface of the optical component. For example, a pattern etched on the front and/or back surface of the optical component can form a Fresnel lens or a grating. Such a patterning of the surface of the front and/or back surface of the optical component is defined herein to be a functional coating. The surface of the optical component operates as a functional coating (and is therefore defined as a functional coating), if the surface of the optical component affects an incident optical beam in a desired manner. For example, in embodiments, the input surface of the optical component reflects all of the incident light and so the input surface functions as a mirror.

Exemplary functional coatings include but are not limited to: a dielectric layer (or a stack of dielectric layers) to form a wavelength dependent beam splitter that reflects one portion of the wavelength spectrum and transmits another portion of the wavelength spectrum; a metal layer to form a mirror that reflects all of a selected wavelength spectrum; a dielectric layer patterned with a diffractive optical element to form a lens to focus light of a selected portion of the wavelength spectrum; a patterned dielectric layer (or a stack of patterned dielectric layers having at least two different refractive indices) to form a polarizer that transmits (or reflects) one polarization of a selected portion of the wavelength spectrum; a patterned metal layer to form a polarizer that transmits (or reflects) one polarization of a selected portion of the wavelength spectrum; and a dielectric layer (or a stack of dielectric layers having at least two different refractive indices) to form a beam splitter at a particular wavelength that reflects a percentage (e.g., 10%) of a selected wavelength spectrum and transmits the non-reflected percentage (e.g., 90%) of the selected wavelength spectrum. The dielectric layer can be wavelength specific (e.g., a dichroic) in the case of a broadband optical source. In the case of a narrow line width optical source, the parameters of dielectric layer determine the fraction of the light reflected and the fraction of light transmitted. Other functional coatings are possible.

The functional coating 128 affects the optical beam 300 that incident on the input surface 120 at the functional incidence angle. In one implementation of this embodiment, the output surface 130 is overlaid with a functional coating. In another implementation of this embodiment, the input surface 120 and the output surface 130 are both overlaid with a functional coating. As described above, in some embodiments, the surface of the optical component operates as a functional coating.

As shown in FIGS. 1A and 1B, the lower portion 110 is bounded by a first side-surface 161, a second side-surface 162, a bottom surface 159, and a boundary 154 of the arm-connecting portion 112. The boundary 154 is about the same length as the bottom surface 159. The top surface 158 opposes the bottom surface 159. The bottom surface 159 shares a first edge 181 with the first side-surface 161. Since FIGS. 1A and 1B are plan views of the optical component 100, the first edge 181 is seen as the point of intersection between the bottom surface 159 and the first side-surface 161 in FIG. 1A. The bottom surface 159 shares a second edge 182 with the second side-surface 162. The second edge 182 is seen as a point of intersection between the bottom surface 159 and the second side-surface 162 in FIG. 1A.

The first side-surface 161 of the optical-path portion 110 is substantially parallel to the second side-surface 162 of the optical-path portion 110. The first side-surface 161 shares a first corner-edge 131 with the first arm 141. The second side-surface 162 shares a second corner-edge 132 with the second arm 142. In this embodiment, the first corner-edge 131 is parallel to the second corner-edge 132.

As shown in FIGS. 1A, 1B and 2, an input optical beam 300 is incident on the functional coating 128 overlaying the input surface 120. The optical beam 300 is transmitted through the optical component 100 and exits the optical component 100 at the output surface 130 as output optical beam 301. In embodiments, the function of the optical component 100 is a total reflector (e.g., a mirror) and the optical beam 300 is reflected by the optical component 100 as an output optical beam (not shown) as is understandable to one skilled in the art.

Figure 3:
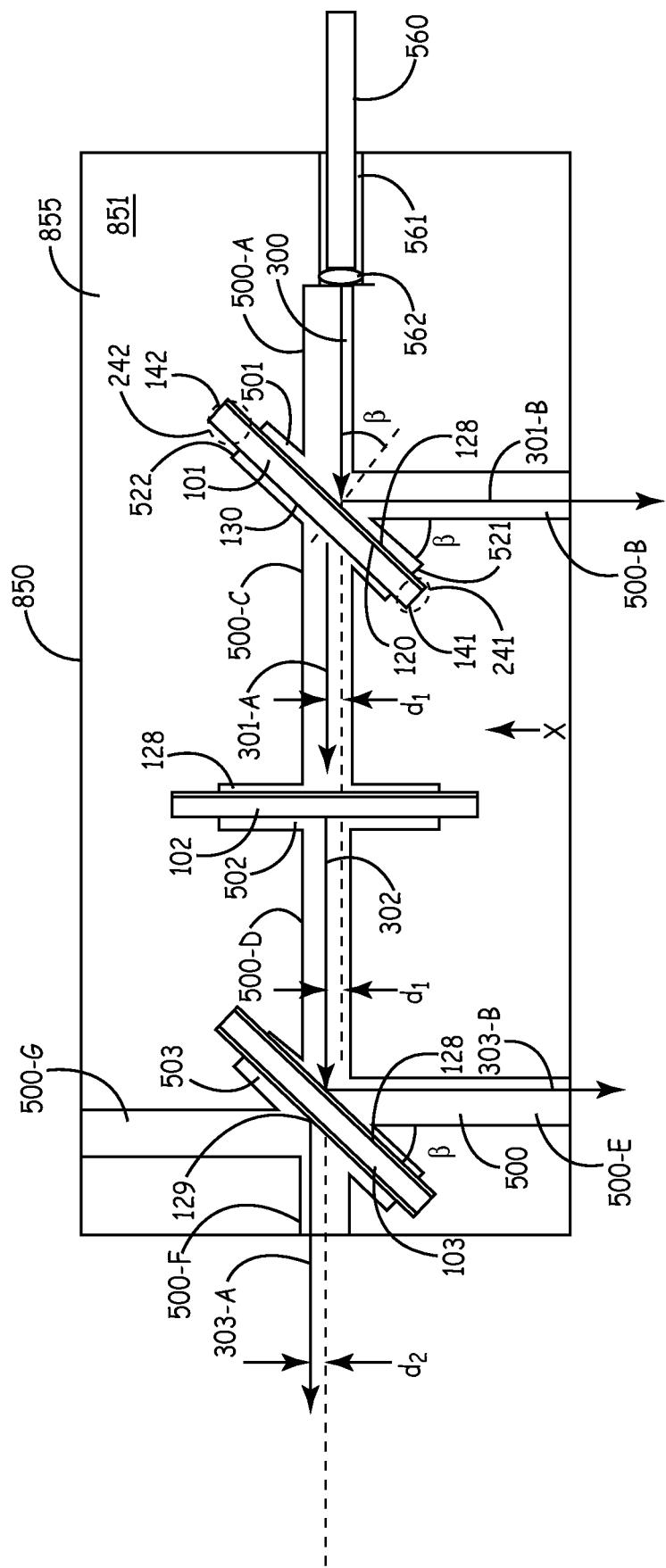
FIG. 3 is a top view of an embodiment of a silicon optical bench having embodiments of optical components arranged therein in accordance with the present invention.

FIG. 3 is a top view of an embodiment of a silicon optical bench 850 having embodiments of optical components 101, 102, and 103 arranged therein in accordance with the present invention. Specifically, the lower portions of the optical components 101-103 are vertically aligned inside associated trenches 501-503. The optical components 101-103 can be either the optical component 101 shown in FIG. 1A or optical component 104 shown in FIG. 1B. A trench is associated with a respective optical component in order to position the optical component at a specific angle (e.g., optical component 101 is at specific angle β) with respect to the optical path of the optical beam (e.g., optical beam 300). The optical path of the optical beam is the path along which the optical beam is propagated. The exemplary optical path shown in FIG. 3 is the path along which the optical beams 300, 301-1, 301-B, 302, 303-A and 303-B propagate.

The trenches 501-503 (also referred to herein as trench segments 501-503) are part of a trench system 500 that is etched into a substrate. As defined herein, a trench system includes a plurality of interconnected trench segments that are patterned so that optical beams are directed to propagate in free space within or above at least one trench segment by at least one optical component that is vertically aligned within at least one of the other trench segments so that the directed optical beams propagate within or above the trench system according to a designed optical system. The trench system 500 includes trench segments 500(A-G) and 501-503.

The trench segments 501-503 have an angular orientation with respect to the trench segments 500(A-F). The angular orientation is correlated to the functional incidence angle of the optical component in the associated trench segment 501-503, as is understandable to one skilled in the art. For example, the optical component 101 has the functional incidence angle β and the trench segment 501 is appropriate oriented with the trench segment 500-A. Specifically, trench segment 501 is at an angle β with respect to trench segment 500-B; trench segment 500-A is perpendicular to trench segment 500-C; and the optical beam 300 propagating through trench segment 500-A has an angle of incidence β on the optical component 101 in the trench segment 501.

In the embodiment shown in FIG. 3, the substrate 855 is a silicon substrate 855 and the trench system 500 is etched into the top surface 851 of the silicon substrate 855 to form the silicon optical bench 850. In other embodiments, the trench system 500 is formed from other materials, such as semiconductor wafers (e.g., GaAs, InP), plastics, ceramics, or glasses. In embodiments, the trench system is the SiOB described in the '822 application, the '458 application, or the '384 application that are each incorporated herein by reference. After an optical component is correctly positioned in the appropriate trench, it is attached to the trench system. In one implementation of this embodiment, the optical component is glued in place on the top surface of the silicon substrate 855. During the attachment process, the optical component is not moved from the correct position.

As shown in FIG. 3, an optical beam 300 is output from the optical fiber 560 situated in a v-groove 561 and is directed by a lens 562 toward the optical component 101 positioned in the trench 501, so that the optical beam 300 travels inside of trench segment 500-A and is incident on the optical component 101 with an angle of incidence of β. Other sources for the optical beam are possible such as an edge emitting laser 560, a vertical cavity surface emitting laser (VCSEL), or an optical system to direct an optical beam coming from outside of the silicon optical bench 850 into the trench system 500.

In the exemplary optical system implemented by the silicon optical bench 850, the optical component 101 reflects a portion of the optical beam 300 as optical beam 301-B into trench segment 500-B and transmits a portion of the optical beam 300 as optical beam 301-A into trench segment 500-C. The optical thickness of optical component 101 causes a lateral offset of $d_1$ between optical beam 300 and optical beam 301-A in the X-direction indicated by the arrow X.

Optical beam 301-A is transmitted through optical component 102 as optical beam 302 into trench segment 500-D. The optical component 103 reflects a portion of the optical beam 302 as optical beam 303-B into trench segment 500-E and transmits a portion of the optical beam 302 as optical beam 303-A into trench segment 500-F. The optical thickness of optical component 103 causes a lateral offset of $d_2$ in the direction X between optical beam 302 and optical beam 303-A. If the trench 503 in the trench system 500 is positioned to hold the optical component 103 in a position rotated by 90 degrees from the position shown in FIG. 3, then the lateral offset of $d_1$ in the positive X-direction by the optical component 501 is compensated for by the lateral offset of $d_1$ in the negative X-direction by the optical component 503. In this manner, the optical beam 303-A is in line with the optical beam 300 as is understandable by one skilled in the art.

As shown in FIG. 3, the lower portion 111 of the optical component 101 is positioned inside the associated trench 501, the resting features 151 and 152 of the first arm 141 and the second arm 142 (FIG. 1A), respectively, are positioned on the top surface 851 adjacent to short edges 521 and 522, respectively, of the trench 501 in the silicon optical bench 850. In this manner, the optical-path portion 110 is vertically aligned in the optical path of the optical beam 300 intersecting the trench 501. The regions represented generally at 241 and 242 are representative of the top surface 851 adjacent to short edges 521 and 522, respectively. When the optical-path portion 110 (FIG. 1A) is vertically aligned in the trench segment 501 associated with the optical component 101, the optical beam 300 is incident on the functional coating 128 and the input surface 120 of the optical-path portion 110 at a functional incidence angle β for the optical component 101. The lower portions of the optical components 102 and 103 are similarly vertically aligned inside the associated trenches 502 and 503 so that the optical beams 301A and 302 are incident on the optical components 102 and 103 at respective functional incidence angles.

As shown in FIG. 3, the optical component 103 has a first functional coating 128 on the input surface 120 (FIGS. 1A and 2) and a second functional coating 129 on the output surface 130 (FIG. 2). In one implementation of this embodiment, an optical component has a functional coating 128 only on the output surface 130 of the optical component.

When the optical path is within a trench of a trench system, an optical beam is guided by the lower portion 111 of the optical component 100 or 104 (FIG. 1A or 1B). If the optical path is slightly above the top surface 851 of the substrate 855 the optical beam is guided by the arm-connecting portion 112 of the optical component 100 or 104 (FIG. 1A or 1B). If the optical path is above the top surface 851 of the substrate 855 the optical beam is guided by the upper portion 311 of the optical component 104 (FIG. 1B).

Figure 4:
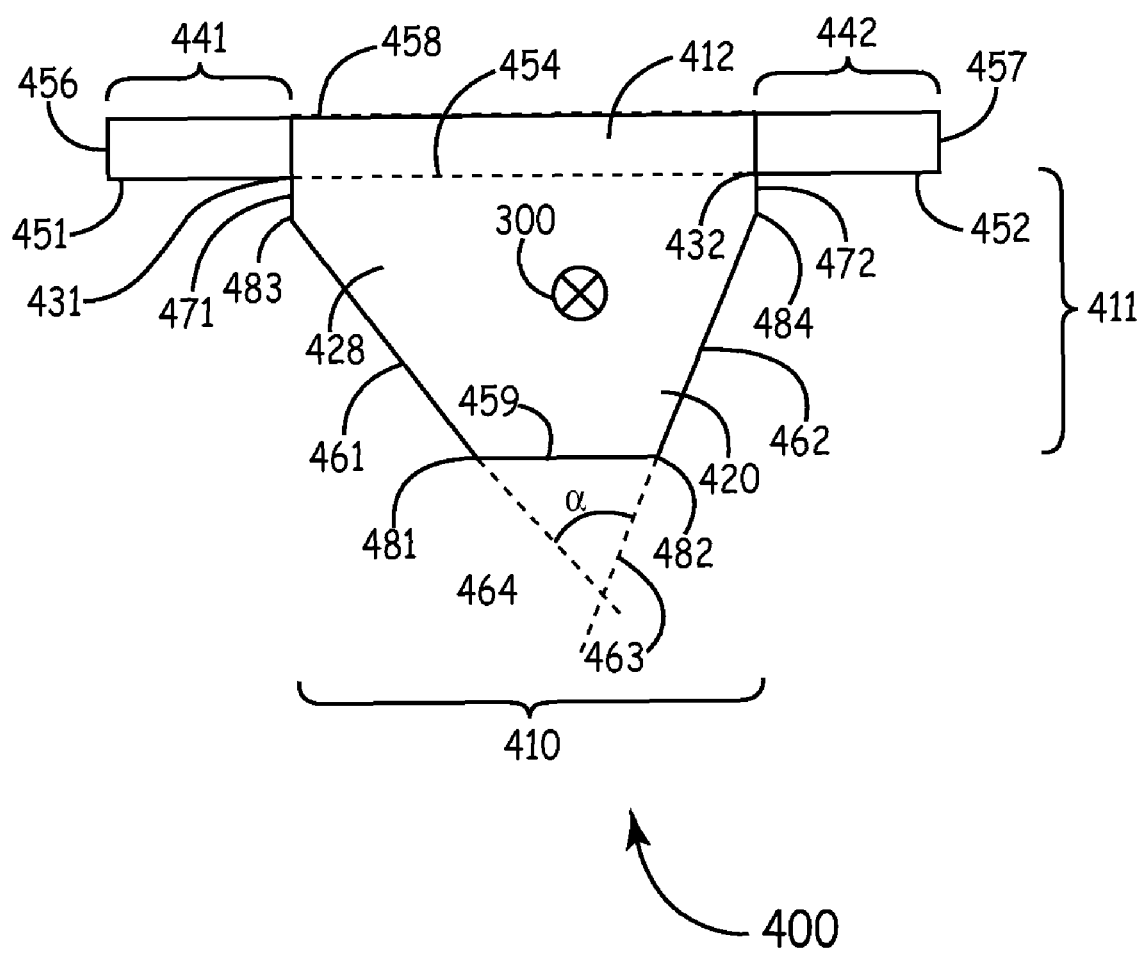
FIG. 4 is a front plan view of an embodiment of an optical component in accordance with the present invention.

FIG. 4 is a front plan view of an embodiment of an optical component 400 in accordance with the present invention. The optical component 400 includes an optical-path portion 410, first arm 441, and second arm 442. The optical-path portion 410 includes a lower portion 411 and an arm-connecting portion 412. In one implementation of this embodiment, the optical component 400 also includes an upper portion (not shown) that is similar to the upper portion 311 of FIG. 1B. The optical component 400 differs from the optical component 100 shown in FIG. 1A in that the side surfaces of the optical-path portion are not parallel to each other and the bottom surface 459 is shorter in length than the boundary 454. The shorter bottom surface of the optical component 400 makes it easier to insert the optical component into a trench and to lay the arms 441 and 442 on the surface adjacent to the short edges of the trench. This narrow bottom configuration is useful in allowing the optical component 400 to hang vertically within a trench segment that has a profile that widens or slopes outward from the bottom of the trench to the top surface of the substrate so the trench is wider at the surface of the substrate than at the depth of the trench.

The optical component 400 also differs from the optical component 100 by having a first notch surface 471 adjacent to and perpendicular to the arm 441 and a second notch surface 472 adjacent to and perpendicular to the second arm 442. The first notch surface 471 is parallel to the second notch surface 472. When the optical component 400 is positioned in a trench segment, such as trench segment 501 (FIG. 3), the first notch surface 471 is parallel to and relatively close to the short edge 521. Likewise, when the optical component 400 is positioned in trench segment 501, the second notch surface 472 is parallel to and relatively close to the short edge 522. This fit of the optical component 400 in the trench segment 501 ensures that the optical component 400 in the trench segment 501 is at the functional incidence angle with respect to the optical 300 as required for the functional coating 428 on the optical component 400. Thus, the first notch surface 471 and the second notch surface 472 prevent the optical component 400 from moving side-to-side or rotationally and align the overall optical component 400 in the associated trench segment (such as trench segment 501, 502, or 503) to ensure the lower portion 411 is centered in the optical path so that the optical beam is incident on the lower portion 411.

As shown in FIG. 4, the lower portion 411 is bounded by: 1) a first side-surface 461 of the lower portion 411; 2) a first notch surface 471; 3) the boundary 454 of the arm-connecting portion 412; 4) a second notch surface 472; and 5) a second side-surface 462 of the lower portion 411. The arm-connecting portion 412 opposes the bottom surface 459. When the optical path is within a trench of a trench system, then an optical beam will pass through the lower portion 411 of the optical component 400.

The first notch surface 471 shares a third edge 483 with the first side-surface 461 of the lower portion 411. The second notch surface 472 shares a fourth edge 484 with the second side-surface 462 of the lower portion 411. The first notch surface shares a first corner-edge 431 with the first arm 441, and the second notch surface 472 shares a second corner-edge 432 with the second arm 442. In some embodiments, the first corner-edge 431 is parallel to the second corner-edge 432.

As shown in FIG. 4, an extension represented generally at 463 of the first side-surface 461 of the optical-path portion intersects an extension represented generally at 464 of the second side-surface 462 in an acute angle α. As defined herein, the extensions 463 and 464 are virtual planes extending from the first side-surface 461 and the second side-surface 462, respectively.

Figure 5:
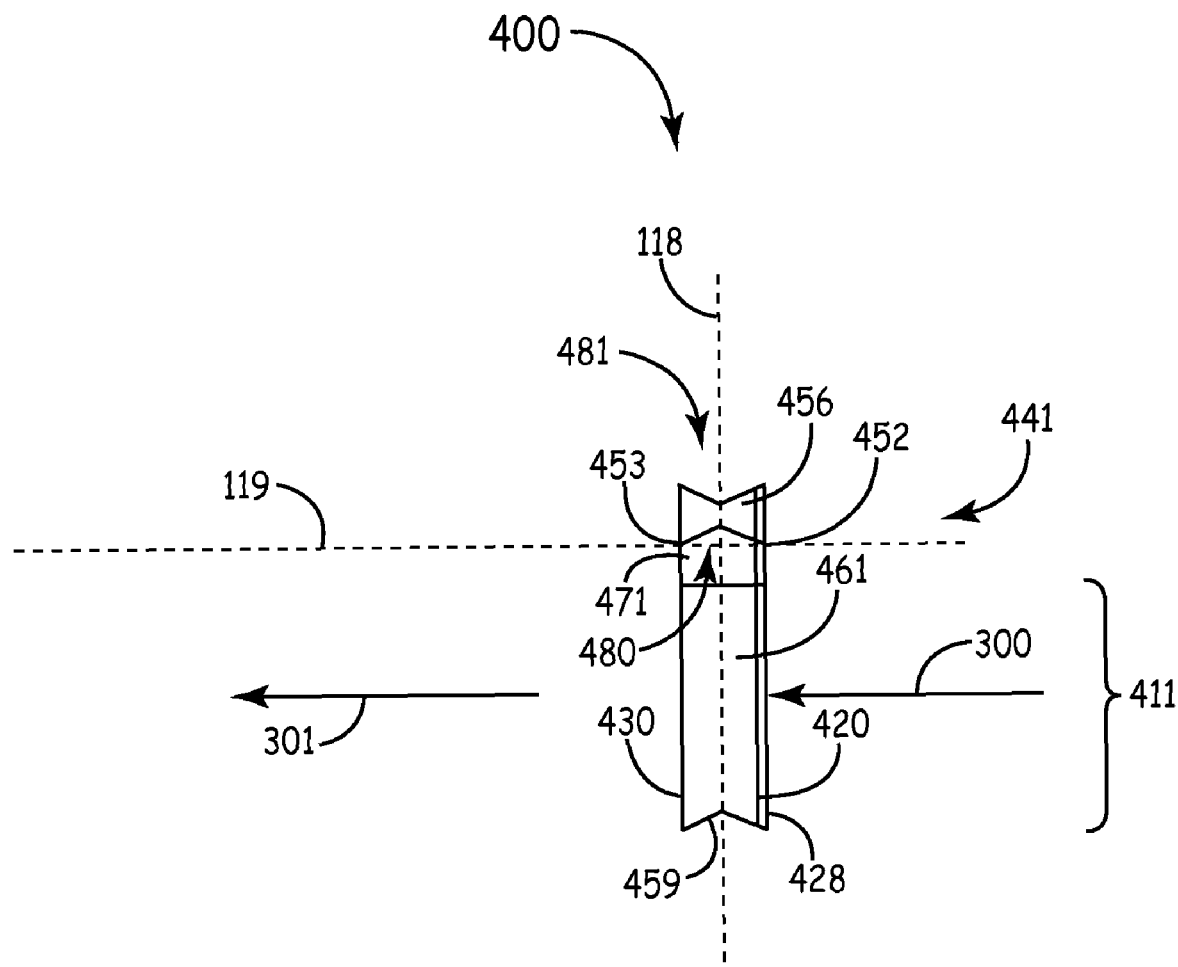
FIG. 5 is a side view of the optical component of FIG. 4.

FIG. 5 is a side view of the optical component of FIG. 4. The first side-surface 461 of the lower portion 411 and the first side-surface 456 of the first arm 441 are shown end-on. In contrast with FIG. 2, the resting feature is not a flat resting surface, but rather includes a front-side edge 452 and a parallel back-side edge 453. The profile of the first side-surface 456 of the first arm 441 seen end-on has the shape of a bow-tie. The narrow part of the bow-tie shape is not necessarily much smaller than the ends of the bow-tie shape, but it is sufficient to create the front-side edge 452 and the parallel back-side edge 453. Specifically, a curved bottom 480 (also referred to herein as a wedge-shaped bottom 480) and the opposing curved top 481 (also referred to herein as a wedge-shaped top 481) are the result of a two DRIE etches into the substrate. The bow-tie pattern is formed since DRIE etches from opposing sides of the substrate from which the optical component 400 is formed create a slightly re-entrant side wall profile that meets in the middle of the substrate. This process is described in detail below. The maximum point of the curved bottom 480 and the minimum point of the curved top 481 are on a bisecting line 118 that bisects the first side-surface 461 of the optical component 400. When each of the two DRIE etches goes half way through the substrate, the maximum/minimum of the wedge-shaped bottom 480 and the wedge-shaped top 481 are on the bisecting line 118.

The front side-edge 452 of the arm 441 is formed during the first DRIE etch from the front surface of the substrate and the back side-edge 453 of the arm 441 is formed during the second DRIE etch from the back surface of the substrate. The line 119 connecting the front side-edge 452 and the back side-edge 453 is perpendicular to the input surface 420 and the output surface 430. Thus, when the front side-edge 452 and the back side-edge 453 rest on the top surface 851 of the top surface 851 of the silicon optical bench 850 (FIG. 3) the optical component 400 is vertically aligned in the trench and in the optical path. A side view of the second side-surface 457 (FIG. 4) of the first arm 441, which is not shown, also has the same bow-tie shape.

Figure 6:
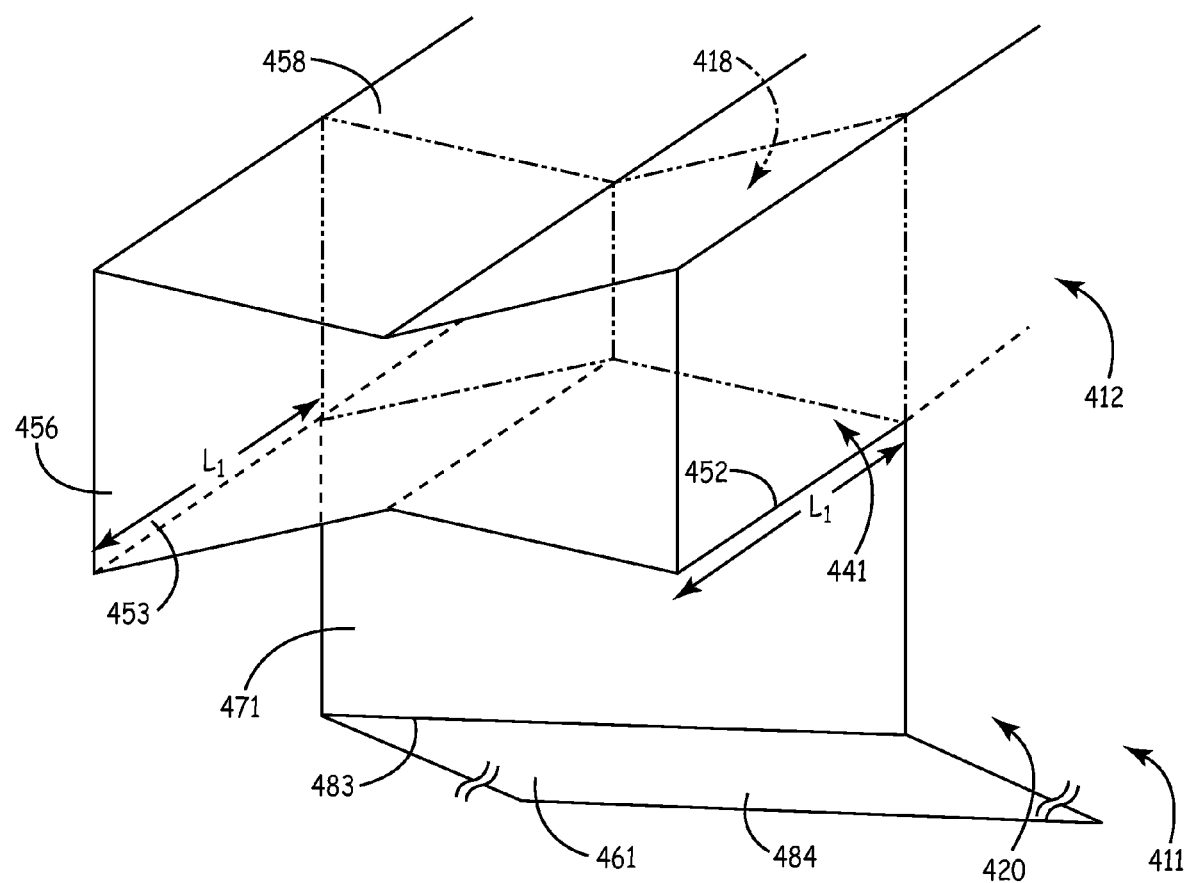
FIG. 6 is an expanded view of the first arm of the optical component of FIG. 4.

FIG. 6 is an expanded view of the first arm of the optical component of FIG. 5. The first end 418 is outlined by the dash-double-dot line. The front side-edge 452 and the back side-edge 453 are clearly shown as lines having length $L_1$. The first arm 441 protrudes from the first end 418 of the arm-connecting portion 412 by the length $L_1$. The first side-surface 461 is shown extending at an angle from the edge 483 (also referred to herein as third edge 483) of the first notch-surface 471. For ease of viewing, the functional coating 428 (FIG. 5) is not shown on the input surface 420 in FIG. 6. However, at least one of the input surface 420 or the output surface 430 (FIGS. 4 and 5) are overlaid by a functional coating 428.

A plane (not shown for ease of viewing) that includes both the front side-edge 452 and the back side-edge 453 is perpendicular to the front surface 420 and the back surface (not shown) of the optical component 400 (FIG. 5). This ensures the optical component 400 is vertically aligned in the trench when the front side-edge 452 and the back side-edge 453 rest on the top surface 851 of the top surface 851 of the silicon optical bench 850 (FIG. 3).

Figure 7:
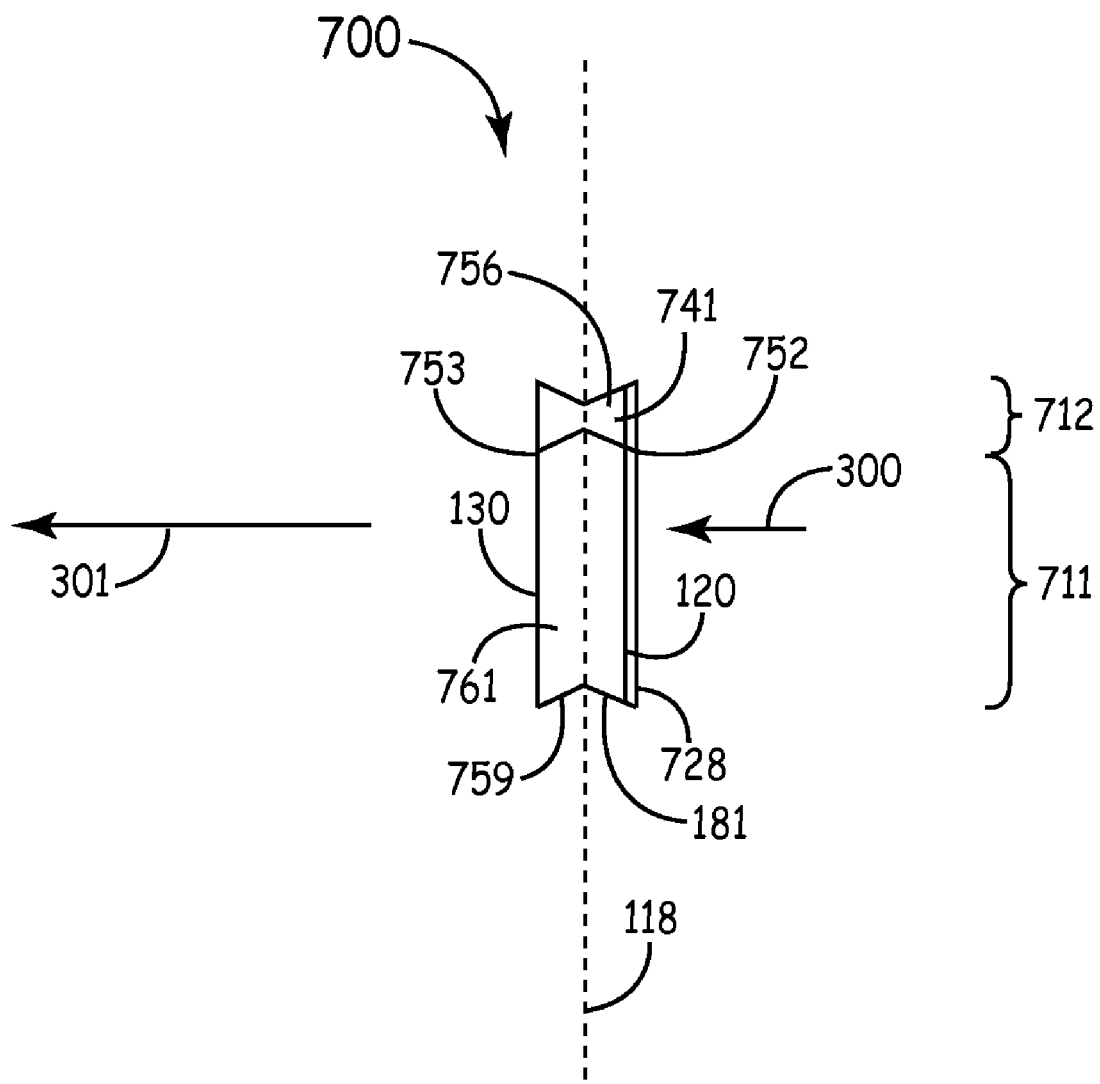
FIG. 7 is a side view of an embodiment of an optical component in accordance with the present invention.

FIG. 7 is a side view of an embodiment of an optical component 700 in accordance with the present invention. The optical component 700 includes a lower portion 711 of an optical-path portion, an arm-connecting portion (not visible), a first arm 741, and a second arm (not visible). The optical component 700 differs from the optical component 400 as shown in FIGS. 4-6 in that in that there is no first notch-surface or second notch-surface on the optical component 700. Thus, in one embodiment, a plan view of the optical component 700 shows the first side-surface 761 of the lower portion 711 extending at an angle (non-orthogonally) from the arm-connecting portion 712 so that the bottom surface 759 is smaller in length than the length of the arm-connecting portion 712. The front side-edge 752 and the back side-edge 753 on the arm 741 are extending from the arm-connecting portion 712 of the optical component 700.

In another implementation of this embodiment, the optical component 700 differs from the optical component 100 as shown in FIG. 2 in that the resting surface of FIG. 2 is replaced by a front-side edge 752 and a parallel back-side edge 753.

Figure 8A:
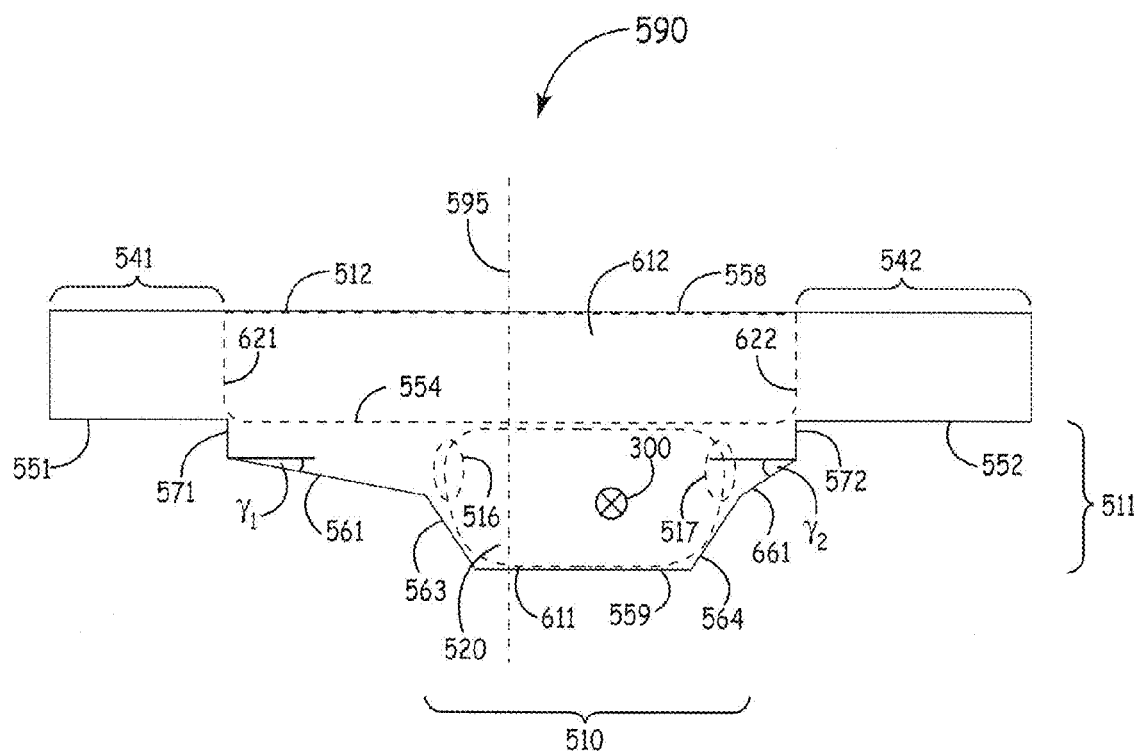
FIG. 8A is a front plan view of an embodiment of an optical component in accordance with the present invention.
Figure 8B:
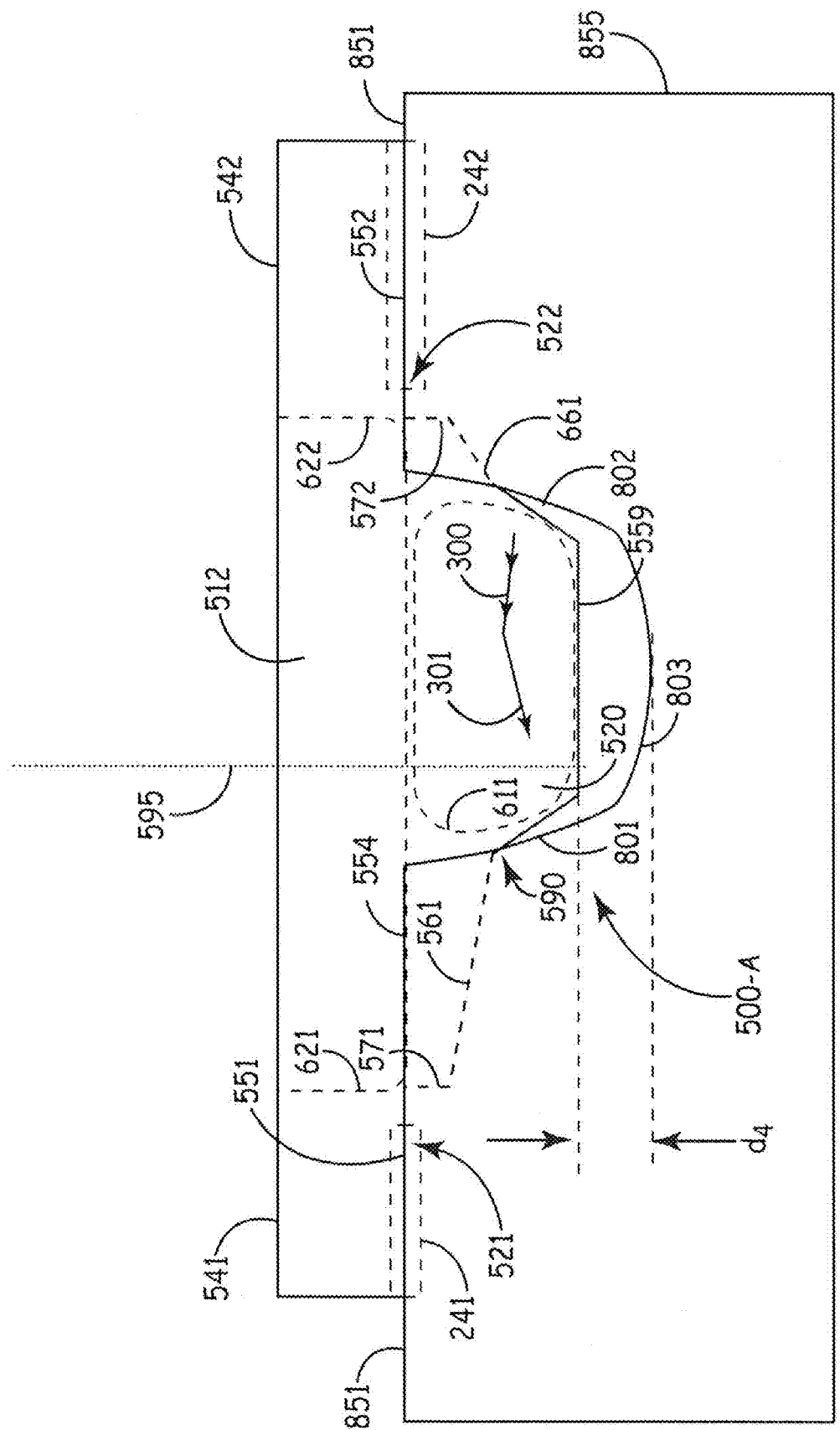
FIG. 8B is a front view of the optical component of FIG. 8A positioned in a trench in accordance with the present invention.

FIG. 8A is a front plan view of an embodiment of an optical component 590 in accordance with the present invention. FIG. 8B is a front view of the optical component 590 of FIG. 8A positioned in a trench in accordance with the present invention. As seen in FIG. 8B, the optical component 590 is positioned in trench 501 (FIG. 3) and is viewed from the trench 500-A (FIG. 3). The optical component 590 includes an optical-path portion 510 (FIG. 8A), a first arm 541, and a second arm 542. The optical-path portion 510 includes a portion of the arm-connecting portion 512 and a region represented generally at 611. In one implementation of this embodiment, the optical-path portion 510 also includes an upper portion similar to the upper portion 311 of FIG. 1B. The first arm 541 extends from a first end 621 of the arm-connecting portion 512 and has at least one resting feature 551. The second arm 542 extends from a second end 622 of the arm-connecting portion 512 and has at least one resting feature 552. The resting features 551 and 552 of the first arm 541 and the second arm 542, respectively, can be either the flat resting surface as shown in FIG. 2 or a front-side edge and a parallel back-side edge as shown in FIG. 5. The second end 622 of the arm-connecting portion 512 opposes the first end 621 of the arm-connecting 512.

In this embodiment, the first side-surface 561 and the second side-surface 661 of the optical-path portion 510 are surfaces of different lengths that are at different angles with respect to the top surface 558 of the arm-connecting portion 512. Thus, the extended angled side walls 561 and 661 are non-symmetric and the lower portion 511 is asymmetric about a center line 595 positioned midway between the first and second arms 541 and 542. The non-symmetric extended angled side walls 561 and 661 extend at a shallow angle $\gamma_1$ and $\gamma_2$ from the first and second notch surfaces 571 and 572, respectively. The relatively shallow angles $\gamma_1$ and $\gamma_2$ ease the guidance of the optical component 400 into a trench in a trench system and keep the optical component 400 from moving laterally within the trench. The angled side walls 561 and 661 hold the optical component 590 in place when the trench is wider than the optical path (e.g., where the trench 501 and the trench 500-A (FIG. 3) intersect.

The optical-path portion 510 has an input surface 520 and an output surface (not visible). The output surface is substantially parallel to the input surface 520. At least one of the input surface 520 or the output surface is overlaid with a functional coating. The functional coating affects the optical beam incident at the functional incidence angle according to the function of the passive optical component 590.

The lower portion 511 is bounded by: 1) a first side-surface 561; 2) a first notch surface 571; 3) the boundary 554 of the arm-connecting portion 512; 4) a second notch surface 572; 5) a second side-surface 661; 6) a third side-surface 564; 7) the bottom surface 559; and 8) a fourth side-surface 563. The side walls 563 and 564 extend from the side walls 561 and 661, respectively. The side walls 563 and 564 each share an edge with the bottom surface 559. The arm-connecting portion 512 opposes the bottom surface 559. The region 611 is bounded by a first side-portion represented generally at 516, the arm-connecting portion 512, a second side-portion represented generally at 517, the third side-surface 564, the bottom surface 559, and the fourth side-surface 563.

The portions of the lower portion 511 positioned between the extended angled side walls 561 and 532 and the boundary 554 are not included in the region 611 of the optical component 590 but are used to hold the optical component 590 in the exemplary trench 501 at the angle β (FIG. 3). As shown in FIG. 8B, the optical beam 300 is incident on the lower portion 511 in approximately the center of the region 611. Optical beam 300 is shown reflected as optical beam 301.

As shown in FIG. 8A, the first side-surface 561 of the optical-path portion 110 is not parallel to the second side-surface 661 and the third side-surface 564 is not parallel to the fourth side-surface 563. In another implementation of this embodiment, the third side-surface 564 is substantially parallel to the fourth side-surface 563.

As shown in FIG. 8B, the trench 500-A is seen in cross-section (also shown in FIG. 3) to include a first side wall 801, a second side wall 802, and a bottom surface 803. The side walls 801 and 802 are non-vertical side walls so the trench 500-A has a profile that slopes outward from the bottom surface 803 of the trench 500-A to the top surface 851 of the substrate 855. The resting feature 551 of the first arm 541 rests on region 241 on the top surface 851 adjacent to short edge 521 of the trench 501. Likewise, the resting feature 552 of the second arm 542 rests on region 242 on the top surface 851 adjacent to short edge 522 of the trench 501 (FIG. 3). The bottom surface 559 of the optical component 590 does not touch the bottom surface 803 of the trench 500-A. The bottom surface 559 of the optical component 590 is offset from the bottom surface 803 of the trench 500-A by the distance $d_4$ at the deepest point of the trench 500-A. The optical component 590 is totally supported by the resting features 551 and 552. In this manner, the lower portion 511 is vertically aligned in the trench 500-A within the path of optical beam 300.

The first notch surface 571 and the second notch surface 572 are close to the short edges 521 and 522, respectively, of the trench 501 (FIG. 3) and the portions of lower portion 511 (FIG. 8A) positioned between the extended angled side walls 561 and 532 and the boundary 554 are held between the long-edge walls of the trench 501 (FIG. 3). This configuration centers the overall optical component 590 in the associated trench 501 with the region 611 of optical-path portion 510 centered in the trench 500-A. This configuration prevents the optical component 590 from moving from side-to-side or rotationally about center line 595 by any significant amount within the trench 501.

Figure 9:
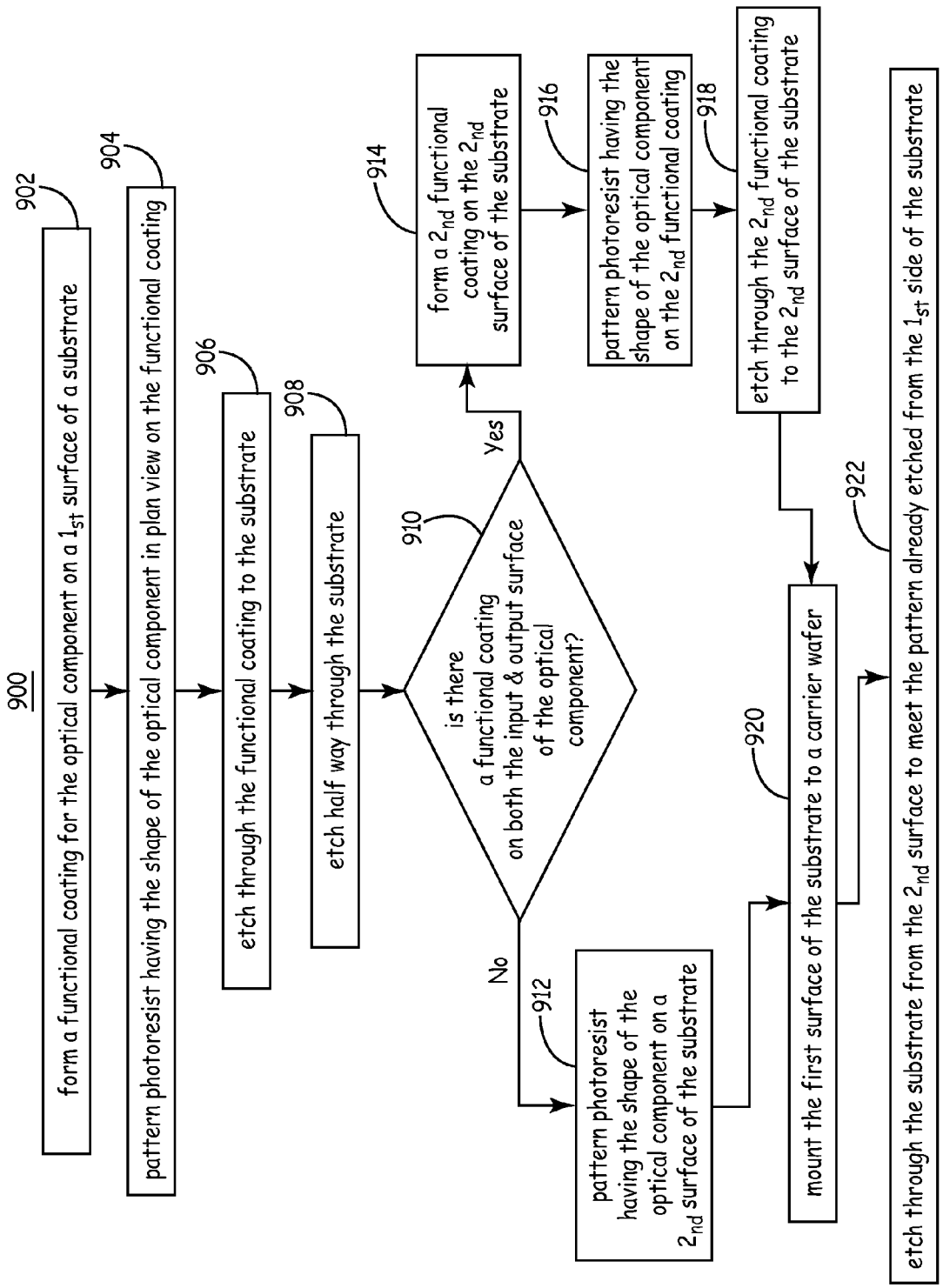
FIG. 9 is an embodiment of a method of fabricating an optical component.

FIG. 9 is an embodiment of a method 900 of fabricating an optical component. The methods for etching silicon can be used to fabricate embodiments of the optical components described herein to successfully eliminate tilt errors when the optical components are inserted into trench segments. Any other substrate material which can be etched with flat side walls can also be used according to the method 900 described with reference to FIG. 9.

A functional coating (a first functional coating) for an optical component is formed on a first surface of a substrate (block 902). In one implementation of this embodiment, the functional coating is formed by etching a pattern on the input surface and/or the output surface of the substrate. The etched patterns form a grating, a Fresnel lens, or other optical component. In another implementation of this embodiment, the optical component is a transmission window, and the functional coating is a dielectric layer or dielectric stack that provides the desired transmission/reflection level. In yet another implementation of this embodiment, the optical component is a mirror and a metal layer is deposited on a silicon wafer to form the mirror surface. In such an embodiment, the metal mirror is patterned to leave openings in the metal down to the substrate in the shape of the optical component in plan view, during step 902. A wet chemical etch is typically used to etch metal. In yet another implementation of this embodiment, the metal layer is applied near the end of the method 900 before the final release of the parts. In yet another implementation of this embodiment, the functional coating is formed by polishing the input surface and/or the output surface of the substrate.

In some embodiments a functional coating is not required and block 902 is not implemented. In one implementation of this embodiment, the optical component is a transmission window and the starting substrate is a double side polished silicon wafer. One surface of the silicon is the first surface of the window and the other surface is the second surface of the window. In another implementation of this embodiment, the optical component is a mirror and the silicon wafer is single side or double side polished.

Photoresist having the shape of the optical component in plan view is patterned on the functional coating (block 904). The pattern is applied to the functional coating on the first side of the substrate using photoresist, a first side photomask, and standard exposure and development processes. The pattern outlines an optical-path portion and first and second arms extending from respective first and second ends of an arm-connecting portion of the optical-path portion as described above with reference to FIGS. 1A-8A. The pattern can include a plurality of optical components having one or more of the plans views as shown in FIGS. 1A, 1B, 4, and 8A. A plurality of sizes and shapes of the patterns can be used on a substrate for use in various trench segments of a trench system or for different trench systems.

The first functional coating is etched through to the substrate (block 906) in the pattern having the shape of the optical component in plan view. The pattern is etched through the dielectrics to the silicon surface. The patterned photoresist formed in block 904 is used as the masking layer when etching through the functional coating. A dry plasma etch is typically used to etch dielectric layers. In the case of a metal mirror, the metal is first etched during step 902 and then any dielectric layers that may be under the metal layer of the mirror are etched. In embodiments in which there is no functional coating, block 906 is not implemented.

The same pattern etched through the functional coating (described at block 906) is now etched at least half way through the substrate (block 908) from the first surface. The photoresist patterned during block 904 acts as the masking layer during block 908. The photoresist is stripped from the first surface of the silicon wafer once the etching of block 908 is completed.

In one implementation of block 908, a DRIE process is used to etch half way through a silicon wafer to create a slightly re-entrant side wall profile and to form a front-side edge as described above with reference to FIGS. 5-7. The remainder of method 900 describes the techniques used to form a back-side edge parallel to the front-side edge.

In another implementation of block 908, a DRIE process is used to etch completely through the substrate to form a resting surface similar to that shown in FIG. 2. This embodiment requires an etching process that maintains a specified angular tolerance from the front surface to the back surface of the substrate. The required angular tolerance is based on the system design and the function of the optical component. In one implementation of this embodiment, the etching process maintains less than a 0.1 degree angle from the front surface to the back surface of the substrate. In such an embodiment, the substrate is mounted to a carrier wafer prior to the etching. Once all the optical components are separated from each other, the optical components are released from the carrier wafer.

If method 900 is used to form an optical component with a functional coating on only one of the input and output surfaces of the optical component (block 910), photoresist having the shape of the optical component in plan view is patterned on the second surface of the substrate (block 912) using double sided alignment techniques known in the art. During a double sided alignment technique, the difference between the front and back alignment must be held to a specific value, which is dependent upon the system design and the function of the optical component, to obtain the required alignment tolerance of the optical component positioned in a trench segment. The flow proceeds to block 920.

If method 900 is used to form an optical component with a functional coating on both the first surface and the second surface of the optical component (block 910), a second functional coating is formed on the second surface of the substrate (block 914). In this case, the functional coating formed at block 902 is a first functional coating. Photoresist having the shape of the optical component in plan view is patterned on the second functional coating (block 916) using double sided alignment techniques that are known in the art. The second functional coating is etched through to the second surface of the substrate (block 918) using the patterned photoresist on the second functional coating as a masking layer. The flow proceeds to block 920.

The first surface of the substrate wafer (overlaid by the first functional coating) is mounted to a carrier wafer (block 920). The substrate wafer can be mounted to the carrier wafer in a number of ways. For example, the substrate wafer can be mounted with a wax or a photoresist layer.

The substrate is etched through from the second surface to meet the pattern already etched from the first surface of the substrate (block 922). The patterned photoresist on the second surface of the substrate is used as a masking layer during the echo of block 922.

The substrate is etched through from the second side using a DRIE etch. This etch will meet the pattern already etched from the first side of the substrate halfway through the substrate. When the substrate etch from the second surface is completed, the optical components are all separated from each other. The separated optical components are released from the carrier wafer by removing the wax or photoresist. Any material used to attach the substrate to the carrier wafer must be able to be easily cleaned off the functional coating after the optical components are separated from each other during the second DRIE etch and removed from the carrier wafer.

Many variations on the above processing sequence can be used with similar end results. In one implementation of method 900, the optical component pattern is patterned and etched to the silicon surface in the dielectrics (functional coatings) on both sides of the wafer before the DRIE etch of the silicon from either side. In this embodiment, blocks 902, 904, 914 and 916 all occur before block 906. In another implementation of method 900, a functional coating is deposited on both sides of the wafer at the start of the process. In this embodiment, block 902 and 914 both occur before block 904. In yet another implementation of this embodiment, a deposition on the second surface occurs after step 922. In this case, a portion of the separated optical components can be selected for metal deposition on the second surface after block 922 is completed.

A number of embodiments of the invention defined by the following claims have been described. Nevertheless, it will be understood that various modifications to the described embodiments may be made without departing from the spirit and scope of the claimed invention. Accordingly, other embodiments are within the scope of the following claims.

What is claimed is:

1. An optical component, the optical component comprising:
    an optical-path portion including an arm-connecting portion and a lower portion, the optical-path portion having an input surface, the lower portion being bounded, in part, by a first notch surface, a second notch surface, a first side-surface, and a second side-surface, wherein first side-surface and the second side-surface extend at a shallow from the respective first and second notch surfaces; and
    a first arm extending from a first end of the arm-connecting portion, the first arm having at least one resting feature; and
    a second arm extending from a second end of the arm-connecting portion, the second end opposing the first end, the second arm having at least one resting feature, wherein, when the resting features of the first arm and the second arm are positioned on a surface of a substrate at short edges of a trench in a trench system, the input surface of the lower portion is aligned, perpendicular to the surface within the trench.

2. The optical component of claim 1, wherein when the optical-path portion is vertically aligned in the trench, an optical beam propagating along an optical path is incident on the input surface of the optical-path portion at a functional incidence angle.

3. The optical component of claim 2, wherein the optical-path portion has an output surface parallel to the input surface, and wherein at least one of the input surface or the output surface is overlaid with a functional coating.

4. The optical component of claim 1, wherein the at least one resting feature comprises one of a resting surface or both a front-side edge and a parallel back-side edge.

5. The optical component of claim 1, wherein the optical-path portion further includes an upper portion, wherein the arm-connecting portion is positioned between lower portion and the upper portion, wherein the arm-connecting portion and the upper portion extend above the surface of the trench system when the lower portion of the optical component is positioned in the trench.

6. The optical component of claim 1, wherein an output surface is substantially parallel to the input surface of the optical-path portion.

7. The optical component of claim 1, wherein the lower portion is further bounded by at least:
    a third side-surface of the optical-path portion;
    a fourth side-surface of the optical-path portion;
    a bottom surface which shares a first edge with the third side-surface and shares a second edge with the fourth side-surface; and
    the arm-connecting portion opposing the bottom surface.

8. The optical component of claim 7, wherein the first notch surface of the lower portion is substantially parallel to the second notch surface of the lower portion, wherein the first notch surface shares a first corner-edge with the first arm, wherein the second notch surface shares a second corner-edge with the second arm, and wherein the first notch surface, the second notch surface, the first side-surface, and the second side-surface are perpendicular to the input surface.

9. The optical component of claim 7, wherein an extension of the third side-surface of the optical-path portion intersects an extension of the fourth side-surface in an acute angle.

10. An optical component, the optical component comprising:
    an optical-path portion formed from silicon, the optical-path portion including an arm-connecting portion and a lower portion, the optical-path portion having an input surface;
    a first arm extending from a first end of the arm-connecting portion, the first arm having front-side edge and a parallel back-side edge; and
    a second arm extending from a second end of the arm-connecting portion, the second arm having a front-side edge and a parallel back-side edge, wherein, when the front-side edge and the back-side edge of the first arm are positioned on a top surface at a first short-edge of a trench in a silicon optical bench and the front-side edge and the back-side edge of the second arm are positioned on the top surface at a second short-edge of the trench, an optical beam propagating along an optical path of the silicon optical bench is incident on the input surface of the optical-path portion at a functional incidence angle.

11. The optical component of claim 10, wherein the optical-path portion further comprises an upper portion.

* * * * *

UNITED STATES PATENT AND TRADEMARK OFFICE
CERTIFICATE OF CORRECTION

| | | |
|---|---|---|
| PATENT NO. | : 8,270,100 B2 | Page 1 of 1 |
| APPLICATION NO. | : 12/611474 | |
| DATED | : September 18, 2012 | |
| INVENTOR(S) | : Detry et al. | |

It is certified that error appears in the above-identified patent and that said Letters Patent is hereby corrected as shown below:

In the claims:

At Column 13, in Claim 1, Line 31, replace "shallow from" with --shallow angle from--

At Column 13, in Claim 1, Line 43, replace "the surface" with --a surface--

Signed and Sealed this
Twenty-seventh Day of November, 2012

David J. Kappos
*Director of the United States Patent and Trademark Office*